(12) United States Patent
McMichael et al.

(10) Patent No.: US 11,921,261 B1
(45) Date of Patent: Mar. 5, 2024

(54) LENS ASSEMBLY FOR SENSORS

(71) Applicant: Zoox, Inc., Foster City, CA (US)

(72) Inventors: Ryan McMichael, Mountain View, CA (US); Robert Nicholas Moor, San Mateo, CA (US); Joseph Patrick Warga, San Francisco, CA (US); Lee Tsung, Foster City, CA (US); Clark Pentico, Ukiah, CA (US)

(73) Assignee: ZOOX, INC., Foster City, CA (US)

( * ) Notice: Subject to any disclaimer, the term of this patent is extended or adjusted under 35 U.S.C. 154(b) by 460 days.

(21) Appl. No.: 17/138,592

(22) Filed: Dec. 30, 2020

Related U.S. Application Data

(60) Provisional application No. 62/992,828, filed on Mar. 20, 2020.

(51) Int. Cl.
    *G02B 13/00*  (2006.01)
    *G02B 3/04*   (2006.01)
    *G02B 27/09*  (2006.01)
    *H04N 23/54*  (2023.01)

(52) U.S. Cl.
    CPC ........... *G02B 13/0045* (2013.01); *G02B 3/04* (2013.01); *G02B 27/0955* (2013.01); *H04N 23/54* (2023.01)

(58) Field of Classification Search
    CPC .. G02B 13/0045; G02B 13/006; G02B 13/18; G02B 13/0015; G02B 15/1445; G02B 15/1455; G02B 15/145521; G02B 15/14552; G02B 15/145513; G02B 15/1465; G02B 15/145529; G02B 15/177; G02B 15/1425; G02B 9/60; G02B 9/62; G02B 9/64; G02B 3/04; G02B 27/0025
    See application file for complete search history.

(56) References Cited

U.S. PATENT DOCUMENTS

2019/0324232 A1\* 10/2019 Yang ................... G02B 9/64

FOREIGN PATENT DOCUMENTS

WO  WO-2017164607 A1 \*  9/2017  ............... G02B 5/20
WO  WO-2020024599 A1 \*  2/2020  ........... G02B 13/004

\* cited by examiner

*Primary Examiner* — Marin Pichler
*Assistant Examiner* — Justin W. Hustoft
(74) *Attorney, Agent, or Firm* — Lee & Hayes P.C.

(57) ABSTRACT

A lens assembly for systems such as imaging devices. The lens assembly may include at least five lens elements, where one or more of the lens elements includes positive optical power and one or more of the lenses includes negative optical power. The lens assembly may further include an aperture stop located between the lens elements. In some instances, the lens assembly provides a horizontal field of view that is at least 80 degrees while still including a total track length that is less than or equal to 50 millimeters and a diameter that is less than or equal to 13 millimeters. Additionally, in some instances, the lens assembly may cause all rays which impinge the sensor to be less than or equal to approximately 10 degrees.

19 Claims, 8 Drawing Sheets

Table 402

| Surface | Object | Radius (mm) | Thickness (mm) | Material | Refractive Index at 597.6nm | Abbe Number | Conic |
|---|---|---|---|---|---|---|---|
| 210(1) | 204(1) | 15.94 | 1.58 | Glass | 1.603 | 60.6 | 0 |
| 210(2) |  | 8.48 | 5.94 | Air |  |  | 0 |
| 212(1) | 204(2) | -346.29 | 1.47 | Glass | 1.603 | 60.6 | 0 |
| 212(2) |  | 10.25 | 9.62 | Air |  |  | 0 |
| 214(1) | 204(3) | -21.22 | 2.8 | Glass | 1.716 | 29.62 | 0 |
| 214(2) |  | -11.38 | 6.43 | Air |  |  | 0 |
| 216(1) | 204(4) | 11.23 | 4.78 | Glass | 1.516 | 64.17 | 0 |
| 216(2) |  | -15.47 | 0.15 | Air |  |  | 0 |
|  | 232 | Infinity | 0 | Air |  |  | 0 |
| 218(1) | 208(1) | 42.86 | 1 | Glass | 1.739 | 28.2 | 0 |
| 218(2)/220(1) | 208(2) | 5.56 | 2.8 | Glass | 1.620 | 60.31 | 0 |
| 220(2) |  | -858.26 | 0.2 | Air |  |  | 0 |
| 222(1) | 204(6) | 7.92 | 2.2 | Glass | 1.619 | 36.43 | 0 |
| 222(2) |  | 5.14 | 4.84 | Air |  |  | 0 |
| 224(1) | 204(7) | 12.64 | 2.51 | Glass | 1.638 | 55.42 | 0 |
| 224(2) |  | 33.29 | 0.09 | Air |  |  | 0 |

| SURFACE | OBJECT | RADIUS (MM) | THICKNESS (MM) | MATERIAL | REFRACTIVE INDEX AT 597.6NM | ABBE NUMBER | CONIC |
|---|---|---|---|---|---|---|---|
| 112(1) | 104(1) | 11.7 | 1.5 | GLASS | 1.693 | 53.18 | -0.79 |
| 112(2) | | 4 | 8 | AIR | | | -1.71 |
| 114(1) | 108(1) | -15 | 4.5 | GLASS | 1.904 | 31.34 | 0 |
| 114(2)/116(1) | 108(2) | 16 | 4.6 | GLASS | 1.883 | 40.76 | 0 |
| 116(2) | | -16 | 0.1 | AIR | | | 0 |
| 120(1) | 104(3) | 13.1 | 3.5 | GLASS | 1.699 | 51.11 | 0 |
| 120(2) | | INFINITY | 2.7 | AIR | | | 0 |
| | 128 | INFINITY | 4.1 | AIR | | | 0 |
| 122(1) | 110(1) | 9.8 | 5.1 | GLASS | 1.497 | 81.54 | 0 |
| 122(2)/124(1) | 110(2) | -8.3 | 0.8 | GLASS | 1.805 | 25.42 | 0 |
| 124(2) | | 47.8 | 2.3 | AIR | | | 0 |
| 126(1) | 104(5) | 11 | 3.7 | GLASS | 1.497 | 81.54 | 1.66 |
| 126(2) | | -50 | 0.6 | AIR | | | 0 |

Table 302

FIG. 3

Table 402

| SURFACE | OBJECT | RADIUS (MM) | THICKNESS (MM) | MATERIAL | REFRACTIVE INDEX AT 597.6NM | ABBE NUMBER | CONIC |
|---|---|---|---|---|---|---|---|
| 210(1) | 204(1) | 15.94 | 1.58 | GLASS | 1.603 | 60.6 | 0 |
| 210(2) | | 8.48 | 5.94 | AIR | | | 0 |
| 212(1) | 204(2) | -346.29 | 1.47 | GLASS | 1.603 | 60.6 | 0 |
| 212(2) | | 10.25 | 9.62 | AIR | | | 0 |
| 214(1) | 204(3) | -21.22 | 2.8 | GLASS | 1.716 | 29.62 | 0 |
| 214(2) | | -11.38 | 6.43 | AIR | | | 0 |
| 216(1) | 204(4) | 11.23 | 4.78 | GLASS | 1.516 | 64.17 | 0 |
| 216(2) | | -15.47 | 0.15 | AIR | | | 0 |
| | 232 | INFINITY | 0 | AIR | | | 0 |
| 218(1) | 208(1) | 42.86 | 1 | GLASS | 1.739 | 28.2 | 0 |
| 218(2)/220(1) | 208(2) | 5.56 | 2.8 | GLASS | 1.620 | 60.31 | 0 |
| 220(2) | | -858.26 | 0.2 | AIR | | | 0 |
| 222(1) | 204(6) | 7.92 | 2.2 | GLASS | 1.619 | 36.43 | 0 |
| 222(2) | | 5.14 | 4.84 | AIR | | | 0 |
| 224(1) | 204(7) | 12.64 | 2.51 | GLASS | 1.638 | 55.42 | 0 |
| 224(2) | | 33.29 | 0.09 | AIR | | | 0 |

FIG. 4

LENS ASSEMBLY FOR SENSORS

RELATED APPLICATIONS

This application claims priority to U.S. Provisional Patent Application No. 62/992,828, filed Mar. 20, 2020, titled "LENS ASSEMBLY FOR SENSORS," the entire contents of which are incorporated herein by reference.

BACKGROUND

Conventional imaging lens assemblies are frequently used in electronic devices, such as mobile phones, tablet computers, cameras, depth sensors, vehicles, and so forth. With the improvements of such electronic devices, there is a need for compact designs of the lens assemblies while still maintaining high quality images. However, current lens assemblies, such as those that include compact designs, are inadequate for many reasons. For example, current lens assemblies do not provide wide enough fields of view (FOV) and/or image qualities that are acceptable for the operations of the electronic devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a table that provides example design parameters for the lens assembly from the example of FIG. 1A, in accordance with embodiments of the disclosure.

FIG. 4 is a table that provides example design parameters for the lens assembly from the example of FIG. 2A, in accordance with embodiments of the disclosure.

DETAILED DESCRIPTION

Figure 1A:
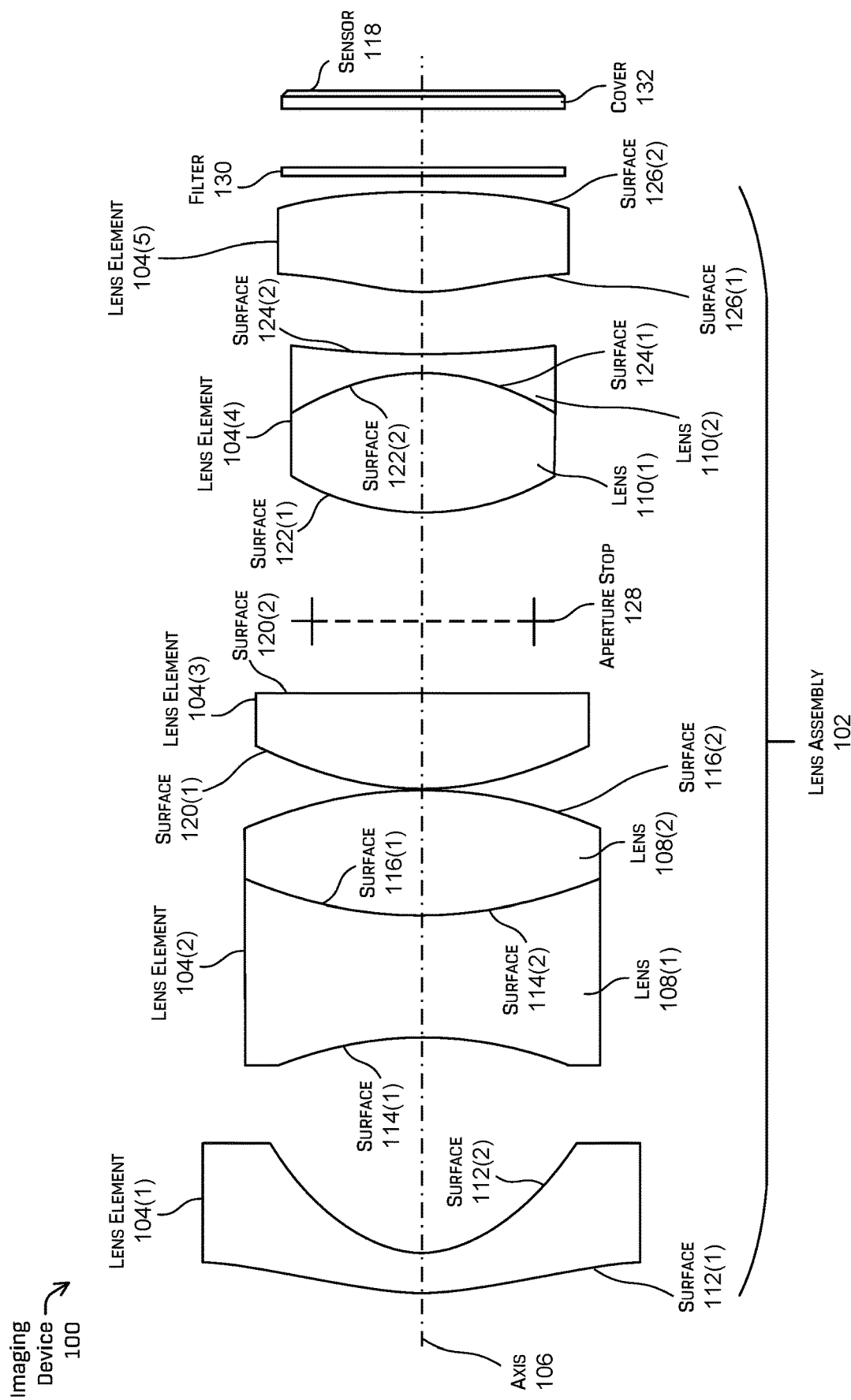
FIG. 1A is a first example of an imaging device that includes a lens assembly, in accordance with embodiments of the disclosure.

As discussed above, electronic devices may include conventional lens assemblies. With the improvements of such electronic devices, there is a need for compact lens assemblies while still maintaining high quality images. However, current lens assemblies, such as those that include compact designs, are inadequate for many reasons. For example, current lens assemblies do not provide wide enough fields of view (FOV) and/or image qualities that are acceptable for the operations of the electronic devices.

As such, this application describes improved lens assemblies that may be used in devices, such as cameras, depth sensors, and/or any other type of device. In some instances, the lens assemblies include compact designs. For a first example, the lens assemblies may include small total track lengths that are between 40 millimeters and 50 millimeters (e.g., 44.86 millimeters). Additionally or alternatively, the lens assemblies may include diameters that are between 8 millimeters and 13 millimeters (e.g., 10.7 millimeters). Additionally, even with the compact designs, the lens assemblies may provide wide fields of views (FOVs) for the imaging devices. For example, the lens assemblies may provide vertical FOVs that are equal to or greater than 50 degrees, horizontal FOVs that are equal to or greater than 80 degrees, and/or diagonal FOVs that are equal to or greater than 95 degrees.

A lens assembly may include one or more lens elements that are arranged in a sequence along an optical axis of the lens assembly, from an entrance side to an exit side of the lens assembly. The "entrance" side may refer to the side of the lens assembly that the light enters and the "exit" side may refer to the side of the lens assembly that the light exits. In the case of a camera or other imaging device, the exit side refers to the side proximate an image sensor. Each lens element may include at least one optical element. An optical element may include, but is not limited to, a biconvex lens, a plano-convex lens, a positive meniscus lens, a negative meniscus lens, a plano-concave lens, a biconcave lens, an aspherical lens, compound lenses, doublet lenses, triplet lenses, and/or any other type of lens, mirror, shutter, aperture, etc. Additionally, a lens element may made of any material, such as, but not limited to, glass (e.g., flint glass, crown glass, etc.), plastic, and/or the like having associated differing indices of refraction (including those materials having negative and/or gradients of indices). In some instances, one or more of the lens elements may have positive optical power adjacent to the optical axis. Additionally, or alternatively, in some instances, one or more of the lens elements may have negative optical power adjacent to the optical axis.

For a first example, a first lens assembly may include five lens elements arranged in a sequence from an entrance side to an exit side and along an optical axis of the first lens assembly. The first lens element (e.g., the lens element located closest to the entrance side) may have negative optical power, the second lens element may include a first lens having negative optical power and a second lens having positive optical power, the third lens element may have positive optical power, the fourth lens element may include a first lens having negative optical power and a second lens having positive optical power, and the fifth lens element (e.g., the lens element located closest to the exit side) may have positive optical power. In some instances, the first lens assembly may further include an aperture stop located between lens elements, such as between the third lens element and the fourth lens element. Of course, in at least some examples, the lens elements may have a differing order. In one example, the aperture may be located in between one or more other lens elements.

For a second example, a second lens assembly may include seven lens elements arranged in a sequence from an entrance side to an exit side and along an optical axis of the second lens assembly. The first lens element (e.g., the lens element located closest to the entrance side) may have negative optical power, the second lens element may have negative optical power, the third lens element may have positive optical power, the fourth lens element may have positive optical power, the fifth lens element may include a first lens having negative optical power and a second lens having positive optical power, the sixth lens element may have negative optical power, and the seventh lens element (e.g., the lens element located closes to the exit side) may have positive optical power. In some instances, the second lens assembly may further include an aperture stop located between lens elements, such as the fourth lens element and the fifth lens element. Of course, in at least some examples, the lens elements may have a differing order. In one example, the aperture may be located in between one or more other lens elements.

In either of the examples above, one or more of the lens elements may be designed to reduce aberrations created by the lens assembly such any aberrations of the system as a whole is minimized (e.g., any one or more of defocus, spherical aberration, coma, astigmatism, field curvature, image distortion, axial chromatic aberration, or lateral chromatic aberration). For example, and with reference to the first lens assembly described above, the second lens element may be designed to reduce field curvature and/or coma. For a second example, and again with reference to the first lens assembly described above, the fourth lens element may be designed to reduce field curvature and astigmatism. While these are just a few examples of lens elements reducing aberrations, in other examples, one or more additional and/or alternative lens elements may be designed to reduce aberrations.

Lens assemblies such as those described above may be included in imaging devices, such as cameras, time of flight devices, infrared imagers, and/or the like. An imaging device may include one or more filters. In some examples, the filter(s) may be located between the lens assembly and a sensor, such as an image sensor. For example, the imaging device may include a filter, such as a band-pass filter (BPF), that passes through certain frequencies of light while rejecting other frequencies of light. For example, the filter(s) may pass through frequencies of light included in the visible light spectrum while rejecting frequencies of light that are included in the non-visible light spectrum. This way, only visible light may reach the sensor, thus reducing the amount of aberrations created by the lens assembly. Additionally or alternatively, one or more filters may be disposed between individual lens elements of the lens assembly.

The techniques described herein can be implemented in a number of ways. Example implementations are provided below with reference to the following figures. Although discussed in the context of a lens assembly for a camera of a vehicle, the methods, apparatuses, and systems described herein can be applied to a variety of systems. Additionally, in some examples, a vehicle may include multiple cameras that include one or more of the lens assemblies described herein.

FIG. 1A is a first example of an imaging device 100 that includes a lens assembly 102, in accordance with embodiments of the disclosure. As shown, the lens assembly 102 may include five lens elements 104(1)-(5) (also referred to as "lens elements 104") arranged in a sequence from an entrance side (e.g., left side) to an exit side (e.g., right side) and along an optical axis 106 of the lens assembly 102. In the illustrated example, the lens assembly 102 may include a first lens element 104(1) that has negative optical power, a second lens element 104(2) that includes a first lens 108(1) having negative optical power and a second lens 108(2) having positive optical power, a third lens element 108(3) having positive optical power, a fourth lens element 108(4) that includes a first lens 110(1) having negative optical power and a second lens 110(2) having positive optical power, and a fifth lens element 104(5) that has positive optical power.

Figure 1B:
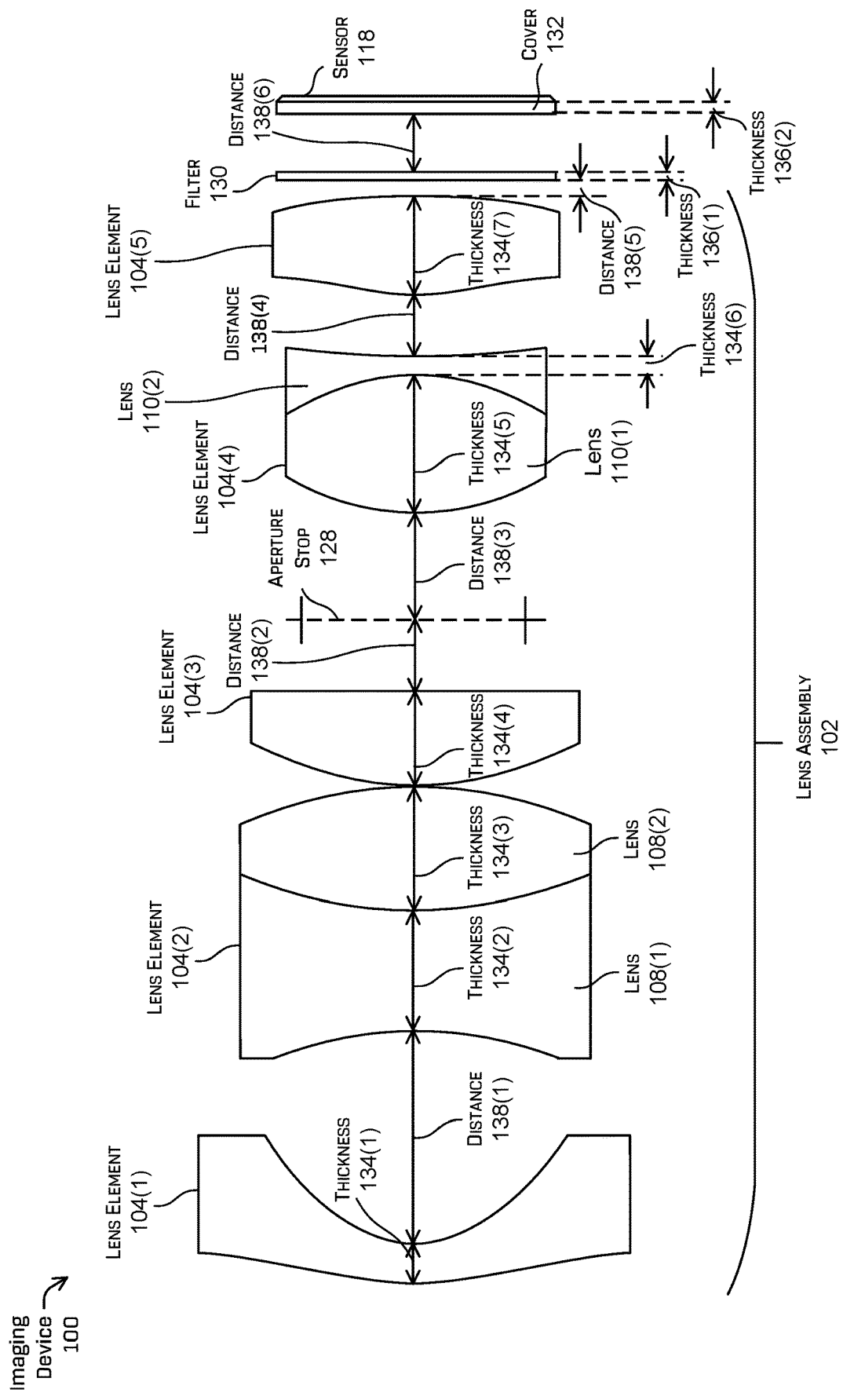
FIG. 1B is an example of thicknesses and relative spacings between optical elements along the optical axis of components of the imaging device from FIG. 1A, in accordance with embodiments of the disclosure.
Figure 1C:
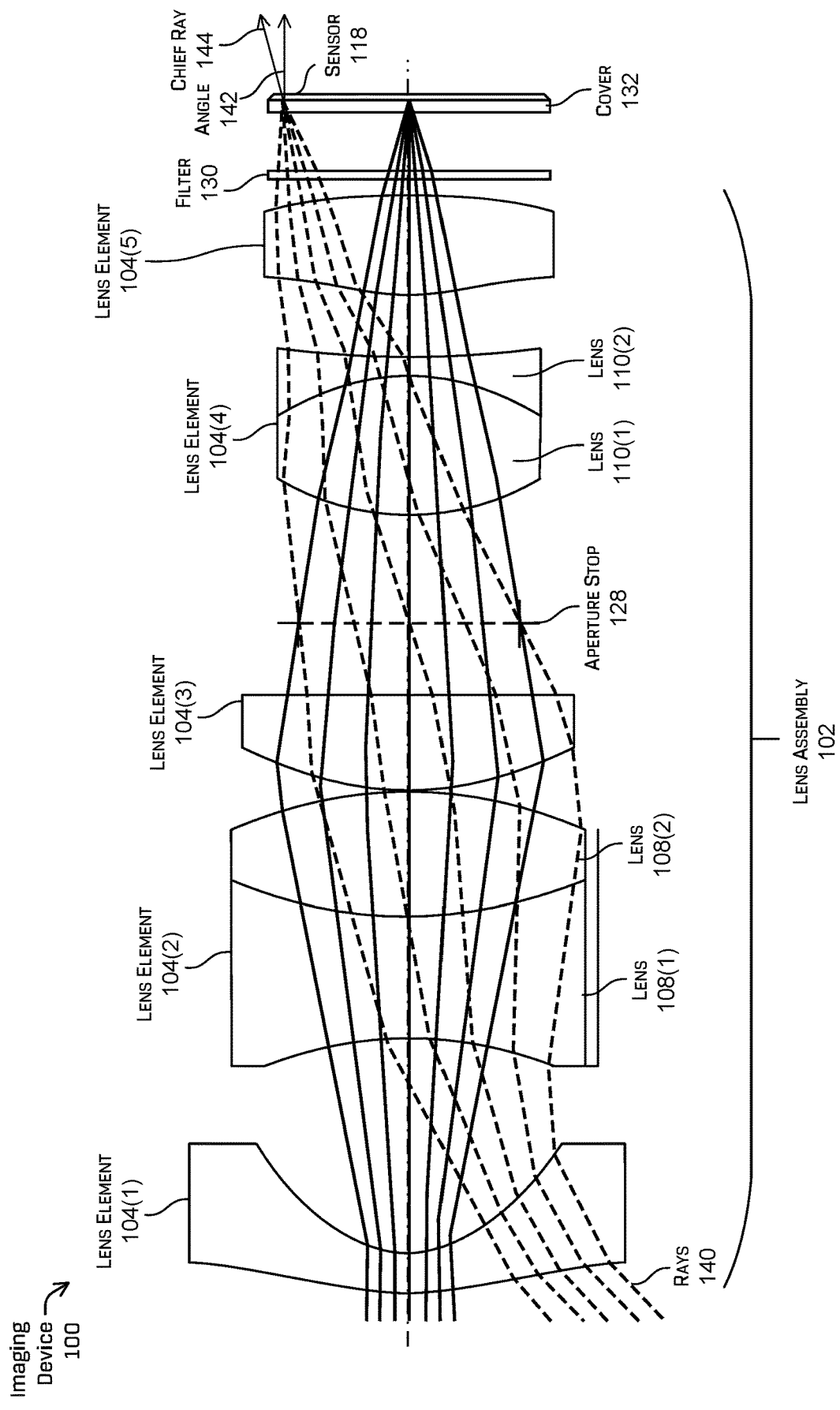
FIG. 1C is an example of light ray bundles passing through the lens assembly from FIG. 1A, in accordance with embodiments of the disclosure.

In the example of FIG. 1A, the first lens element 104(1) may be designed to reduce the angle of the field rays entering the lens element 104(1) relative to the optical axis (see FIG. 1C). The first lens element 104(1) includes a surface 112(1) located on the entrance side and a surface 112(2) located on the exit side of the first lens element 104(1). The first lens element 104(1) may include a negative meniscus lens, where the surface 112(1) includes a convex, aspherical surface and the surface 112(2) includes a concave, aspherical surface. In some instances, the curvature of the surface 112(1) may include a radius between 9 millimeters and 13 millimeters (e.g., 11.7 millimeters) with a conic between −0.5 and −0.9 (e.g., −0.79), while the curvature of the surface 112(2) may include a radius between 1 millimeter and 7 millimeters (e.g., 4 millimeters) with a conic between −1.5 and −2 (e.g., −1.71). However, in other examples, the curvature of the surface 112(1) and/or the curvature of the surface 112(2) may include any other radius. Additionally, in other examples, the surface 112(1) and/or the surface 112(2) may include any other conic.

The second lens element 104(2) may be designed to also reduce the angle of the field rays relative to the optical axis, while still imparting minimal field aperture and coma within the lens assembly 102 (see the specifications described herein). The first lens 108(1) includes a surface 114(1) located on the entrance side and a surface 114(2) located on the exit side of the first lens 108(1). The first lens 108(1) may include a biconcave lens, where the surface 114(1) includes a first concave surface and the surface 114(2) includes a second concave surface. In some instances, the curvature of the surface 114(1) may include a radius between 12 millimeters and 18 millimeters (e.g., 15 millimeters) while the curvature of the surface 114(2) may include a radius between 13 millimeter and 19 millimeters (e.g., 16 millimeters). However, in other examples, the curvature of the surface 114(1) and/or the curvature of the surface 114(2) may include any other radius.

The second lens 108(2) includes a surface 116(1) located on the entrance side and a surface 116(2) located on the exit side of the second lens 108(2). The second lens 108(2) may include a biconvex lens, where the surface 116(1) includes a first convex surface and the surface 116(2) includes a second convex surface. In some instances, the curvature of the surface 116(1) may include a radius between 13 millimeters and 19 millimeters (e.g., 16 millimeters) while the curvature of the surface 116(2) may include a radius between 13 millimeters and 19 millimeters (e.g., 16 millimeters). However, in other examples, the curvature of the surface 116(1) and/or the curvature of the surface 116(2) may include any other radius. In some examples, the first lens 108(1) includes the same material as the second lens 108(2). In other examples, the first lens 108(1) includes a different material than the second lens 108(2).

The third lens element 104(3) may be designed to begin focusing the rays towards a center of a sensor 118, such as an image sensor. The third lens element 104(3) includes a surface 120(1) located on the entrance side and a surface 120(2) located on the exit side of the third lens element 104(3). The third lens element 104(3) may include a plano-convex lens, where the surface 120(1) includes a convex surface and the surface 120(2) includes a flat or planar surface. In some instances, the curvature of the surface 120(1) may include a radius between 10 millimeters and 16 millimeters (e.g., 13.1 millimeters). However, in other examples, the curvature of the surface 120(1) may include any other radius. Additionally, in some examples, the surface 120(2) may include a concave surface or convex surface.

The fourth lens element 104(4) may be designed to correct chromatic aberrations in the lens assembly 102 (e.g., axial and/or lateral). The first lens 110(1) includes a surface 122(1) located on the entrance side and a surface 122(2) located on the exit side of the first lens 110(1). The first lens 108(1) may include a biconvex lens, where the surface 122(1) includes a first convex surface and the surface 122(2) includes a second convex surface. In some instances, the curvature of the surface 122(1) may include a radius between 6 millimeters and 13 millimeters (e.g., 9.8 millimeters) while the curvature of the surface 122(2) may include a radius between 5 millimeters and 11 millimeters (e.g., 8.3 millimeters). However, in other examples, the curvature of the surface 122(1) and/or the curvature of the surface 122(2) may include any other radius.

The second lens 110(2) includes a surface 124(1) located on the entrance side and a surface 124(2) located on the exit side of the second lens 110(2). The surface 124(1) may include a biconcave lens, where the surface 124(1) includes a first concave surface and the surface 124(2) includes a second concave surface. In some instances, the curvature of the surface 124(1) may include a radius between 5 millimeters and 13 millimeters (e.g., 9.8 millimeters) while the curvature of the surface 124(2) may include a radius between 42 millimeters and 52 millimeters (e.g., 47.8 millimeters). However, in other examples, the curvature of the surface 124(1) and/or the curvature of the surface 124(2) may include any other radius. In some examples, the first lens 110(1) includes the same material as the second lens 110(2). In other examples, the first lens 110(1) includes a different material than the second lens 110(2). For example, the first lens 110(1) may include crown glass while the second lens 110(2) includes flint glass.

Finally, the fifth lens element 104(5) in this example may be designed to reduce astigmatism and field curvature, while also setting the angle of the rays (discussed in FIG. 1C) at the exit of the lens assembly (e.g., the angle of the rays relative to the image sensor). The fifth lens element 104(5) includes a surface 126(1) located on the entrance side and a surface 126(2) located on the exit side of the fifth lens element 104(5). The fifth lens element 104(5) may include a biconvex lens, where the surface 126(1) includes a first convex, aspherical surface and the surface 126(2) includes a second convex surface. In some instances, the curvature of the surface 126(1) may include a radius between 8 millimeters and 14 millimeters (e.g., 11 millimeters) and a conic between 1.5 and 2 (e.g., 1.66), while the curvature of the surface 126(2) may include a radius between 45 millimeter and 55 millimeters (e.g., 50 millimeters). However, in other examples, the curvature of the surface 126(1) and/or the curvature of the surface 126(2) may include any other radius. Additionally, in other examples, the surface 126(1) may include any other conic. As further illustrated in the example of FIG. 1A, the lens assembly 102 may include an aperture stop 128 located between the third lens element 104(3) and the fourth lens element 104(4). In some instances, the diameter of the aperture stop 128 may be approximately the same as the diameter of one or more of the lens elements 104. This may maximize the amount of light that is able to pass through the lens assembly 102 to the sensor 118 while still minimizing a form factor of the lens assembly. As described herein, a diameter of a component (e.g., the lens elements 104, the aperture stop 128, etc.) is approximately the same as a diameter of another component when the diameters are within a threshold length to one another (e.g., one diameter is at most 5 millimeters different—larger or smaller—than the other diameter).

The imaging device 100 may also include a filter 130 located between the lens assembly 102 and the sensor 118. The filter 130 may allow certain frequencies of light to pass through to the sensor 118 while not allowing other frequencies of light to pass through to the sensor 118. For example, the filter 130 may allow frequencies of light included in the visible light spectrum to pass through to the sensor 118 while not letting frequencies of light that are included in the non-visible light spectrum to pass through to the senor 118. This way, only visible light may reach the sensor 118, thus reducing the amount of aberrations created by the lens assembly 102.

Although the example of FIG. 1A illustrates the filter 130 as being separate from the lens assembly 102, in other examples, the filter 130 may be included within the lens assembly 102. For example, the filter 130 may be located between two of the lens elements 104 within the lens assembly 102. Additionally, in some examples, the imaging device 100 may not include the filter 130.

Additionally, the imaging device 100 may include a cover 132 for the sensor 118. In some instances, the cover 132 may include a transparent material, such as glass or plastic, that allows the light rays to pass through to the sensor 118.

In some instances, the lens assembly 102 may include a total track length that is between 40 millimeters and 50 millimeters (e.g., 44.86 millimeters). The lens assembly 102 may also include a diameter that is between 8 millimeters and 13 millimeters (e.g., 10.7 millimeters). Additionally, the lens assembly 102 may provide a vertical FOV that is equal to or greater than 50 degrees, a horizontal FOV that is equal to or greater than 80 degrees, and/or a diagonal FOV that is equal to or greater than 95 degrees. Furthermore, the lens assembly 102 may provide a focal length that is between 1 millimeter and 3 millimeters (e.g., 1.75 millimeters).

While the example of FIG. 1A illustrates the lens elements 104 being arranged sequentially along the optical axis from the first lens element 104(1) to the fifth lens element 104(5), in other examples, the lens elements 104 included in the lens assembly 102 may include a different arrangement. Additionally, in some examples, the aperture stop 128 may be located at a different location within the lens assembly 102. For example, the aperture stop 128 may be located between the first lens element 104(1) and the second lens element 104(2). Furthermore, in some examples, the aperture stop 128 may be located outside of the lens assembly 102.

FIG. 1B is an example of thicknesses and spacings along the optical axis 106 of components of the imaging device 100 from FIG. 1A, in accordance with embodiments of the disclosure. As shown, the first lens element 104(2) may include a thickness 134(1) between 1 millimeter and 2 millimeters (e.g., 1.5 millimeters), the first lens 108(1) of the second lens element 104(2) may include a thickness 134(2) between 3 millimeters and 6 millimeters (e.g., 4.5 millimeters), the second lens 108(2) of the second lens element 104(2) may include a thickness 134(3) between 3 millimeters and 6 millimeters (e.g., 4.6 millimeters), the third lens element 104(3) may include a thickness 134(4) between 2 millimeters and 5 millimeters (e.g., 3.5 millimeters), the first lens 110(1) of the fourth lens element 104(4) may include a thickness 134(5) between 4 millimeters and 7 millimeters (e.g., 5.1 millimeters), the second lens 10(2) of the fourth lens element 104(4) may include a thickness 134(6) between 0.1 millimeters and 3 millimeters (e.g., 0.8 millimeters), and the fifth lens element 104(5) may include a thickness 134(7) between 2 millimeters and 5 millimeters (e.g., 3.7 millimeters).

The example of FIG. 1B also illustrates the thicknesses of other components of the imaging device 100. For example, the filter 130 may include a thickness 136(1) between 0.1 millimeters and 0.7 millimeters (e.g., 0.3 millimeters) and the cover 132 may include a thickness 136(2) between 0.1 millimeters and 0.8 millimeters (e.g., 0.5 millimeters).

Furthermore, the example of FIG. 1B illustrates the distances between the components of the imaging device 100. For example, the distance 138(1) between the first lens element 104(1) and the second lens element 104(2) may be between 6 millimeters and 10 millimeters (e.g., 8 millimeters), the distance between the second lens element 104(2) and the third lens element 104(3) (not illustrated for clarity reasons) may be between 0.1 millimeters and 0.5 millimeters (e.g., 0.1 millimeters), the distance 138(2) between the third lens element 104(3) and the aperture stop 128 may be between 2 millimeters and 4 millimeters (e.g., 2.7 millimeters), the distance 138(3) between the aperture stop 128 and the fourth lens element 104(4) may be between 2 millimeters and 6 millimeters (e.g., 4.1 millimeters), the distance 138(4) between the fourth lens element 104(4) and the fifth lens element 104(5) may be between 1 millimeter and 4 millimeters (e.g., 2.3 millimeters), the distance 138(5) between the fifth lens element 104(5) and the filter 130 may be between 0.2 millimeters and 1 millimeter (e.g., 0.6 millimeters), and the distance 138(6) between the filter 130 and the cover 132 may be between 1 millimeter and 3 millimeters (e.g., 1.9 millimeters).

In some instances, the thickness of all of the lens elements 104 along the optical axis 106 and the thickness of the lens elements 104 along an upper axis and/or lower axis of the lens elements 104 are approximately equal (e.g., within 1 millimeter, within 3 millimeters, within 5 millimeters, etc.). In other words, based on the Petzval Sum of the lens assembly 102, the lens assembly 102 reduces the amount of field curvature that occurs within the lens assembly 102.

It should be noted that, in some examples, the imaging device 100 may not include the filter 130 and/or the cover 132. In such instances, the distance between the fifth lens element 104(5) and the sensor 118 may be between 2 millimeters and 5 millimeters (e.g., 3.51 millimeters).

FIG. 1C is an example of light ray bundles passing through the lens assembly 102 from FIG. 1A, in accordance with embodiments of the disclosure. As shown, the first lens element 104(1), which includes negative optical power, is configured to reduce the large angles of the rays 140 entering the lens assembly 102. Also, since the first lens element 104(1) includes negative optical power, the first lens element 104(1) is configured to diverge the rays 140.

The first lens 108(1) of the second lens element 104(2), which includes negative optical power, corrects the aberrations created by the first lens element 104(1). Also, since the first lens 108(1) includes negative optical power, the first lens 108(1) is configured to further diverge the rays 140. The second lens 108(2) of the second lens element 104(2), which includes positive optical power, also corrects the aberrations created by the first lens element 104(1). Also, since the second lens 108(2) includes positive optical power, the second lens 108(2) is configured to converge the rays 140.

The third lens element 104(3), which includes positive optical power, is configured to begin focusing the rays 140 towards the sensor 118 while compensating for field curvature of the first lens element 104(1). Also, since the third lens element 104(3) includes positive optical power, the third lens element 104(3) is configured to further converge the rays 140.

The first lens 110(1) of the fourth lens element 104(4), which includes positive optical power, corrects chromatic aberrations. Also, since the first lens 110(1) includes positive optical power, the first lens 110(1) is configured to further converge the rays 140. The second lens 110(1) of the fourth lens element 104(4), which includes negative optical power, also corrects the chromatic aberrations. Also, since the second lens 110(2) includes negative optical power, the second lens 110(2) is configured to diverge the rays 140.

The fifth lens element 104(5), which includes positive optical power, corrects astigmatism and field curvature. Also, since the fifth lens element 104(5) includes positive optical power, the fifth lens element 104(5) is configured to converge the rays 140. For example, and as shown in FIG. 1C, the fifth lens element 104(5) causes an angle 142 for a chief ray 144 incident to the sensor 118 and proximate to an edge of the sensor 118 to be approximately 10 degrees (e.g., between 8 degrees and 12 degrees). However, in other examples, the angle 142 may be less than 8 degrees or greater than 12 degrees. Additionally, the fifth lens element 104(5) may cause an angle for rays of light incident to sensor 118 and proximate to the middle of the sensor to be approximately 0 degrees (e.g., between −2 degrees, and 2 degrees).

Figure 2A:
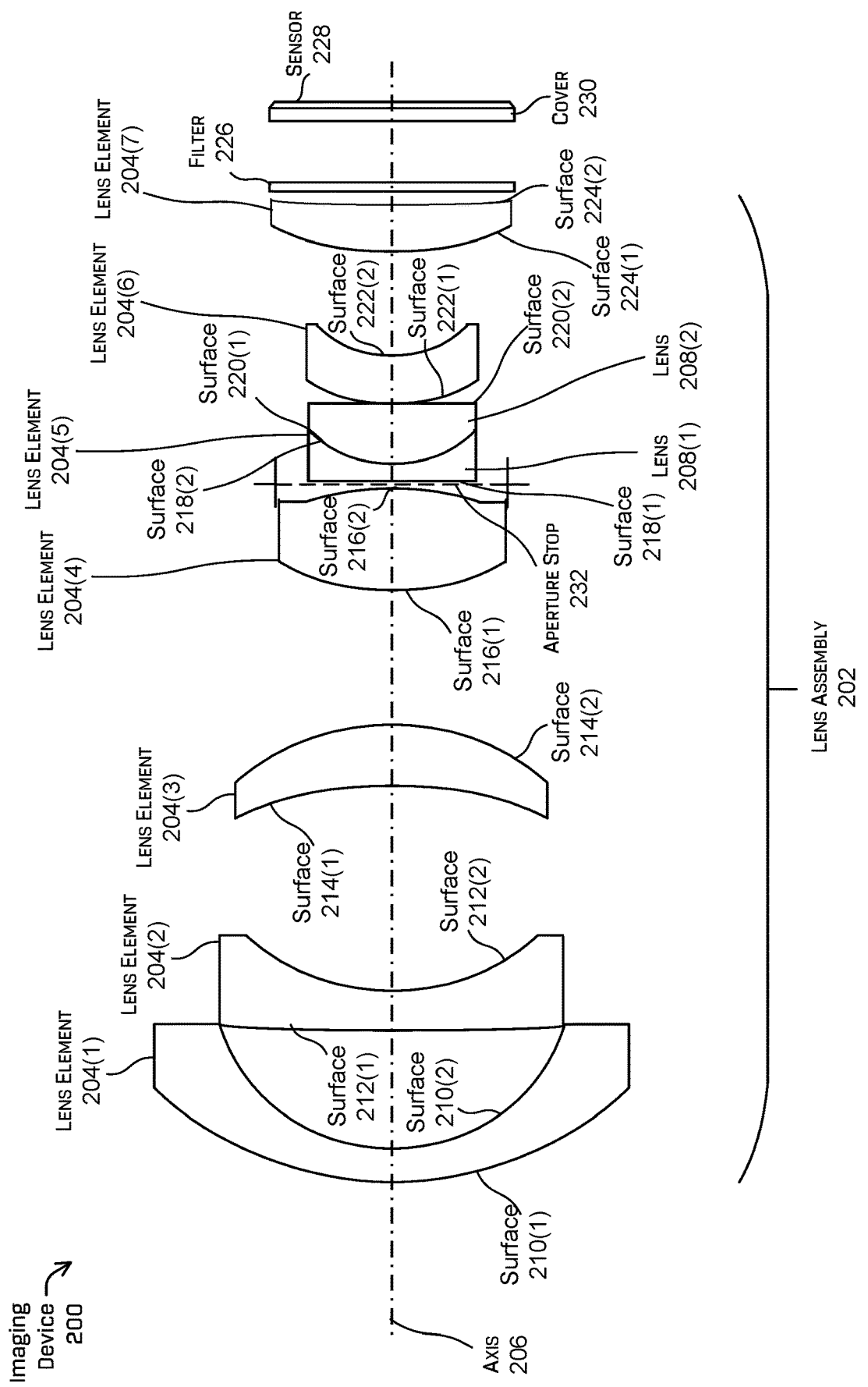
FIG. 2A is a second example of an imaging device that includes a lens assembly, in accordance with embodiments of the disclosure.

FIG. 2A is a second example of an imaging device 200 that includes a lens assembly 202, in accordance with embodiments of the disclosure. As shown, the lens assembly 202 may include seven lens elements 204(1)-(7) (also referred to as "lens elements 204") arranged in a sequence from an entrance side (e.g., left side) to an exit side (e.g., right side) along an optical axis 206 of the lens assembly 202. More specifically, the lens assembly 202 may include a first lens element 204(1) that has negative optical power, a second lens element 204(2) that has negative optical power, a third lens element 204(3) that has positive optical power, a fourth lens element 204(4) that has positive optical power, a fifth lens element 204(1) that includes a first lens 208(1) having negative optical power and a second lens 208(2) having positive optical power, a sixth lens element 204(6) that has negative optical power, and a seventh lens element 204(7) that has positive optical power.

In the example of FIG. 2A, the first lens element 204(1) may be designed to reduce the angle of the field rays entering the lens element 204(1). The first lens element 204(1) includes a surface 210(1) located on the entrance side and a surface 210(2) located on the exit side of the first lens element 204(1). The first lens element 204(1) may include a negative meniscus lens, where the surface 210(1) includes a convex surface and the surface 210(2) includes a concave surface. In some instances, the curvature of the surface 210(1) may include a radius between 12 millimeters and 18 millimeters (e.g., 15.94 millimeters) while the curvature of the surface 210(2) may include a radius between 5 millimeter and 11 millimeters (e.g., 8.48 millimeters). However, in other examples, the curvature of the surface 210(1) and/or the curvature of the surface 210(2) may include any other radius.

The second lens element 204(2) may be designed to reduce the chief rays of the lens assembly 202. The second lens element 204(2) may include a surface 212(1) located on the entrance side and a surface 212(2) located on the exit side of the second lens element 204(2). The second lens element 204(2) may include a negative meniscus lens, where the surface 212(1) includes a convex surface and the surface 212(2) includes a concave surface. In some instances, the curvature of the surface 212(1) may include a radius between 320 millimeters and 370 millimeters (e.g., 346.29 millimeters) and the curvature of the surface 212(2) may include a radius between 7 millimeter and 13 millimeters (e.g., 10.25 millimeters). However, in other examples, the curvature of the surface 212(1) and/or the curvature of the surface 212(2) may include any other radius. Additionally, in other examples, the surface 210(1) may include a concave, a convex, and/or an aspherical surface.

The third lens element 204(3) may be designed to reduce the marginal ray angle, compensate for lateral color of previous lenses so that chromatic ray separation is minimal at a subsequent aperture stop, and balances spherical aberrations and coma. The third lens element 204(3) includes a surface 214(1) located on the entrance side and a surface 214(2) located on the exit side of the third lens element 204(3). The third lens element 204(3) may include a negative meniscus lens, where the surface 214(1) includes a aspherical surface and the surface 214(2) includes a convex surface. In some instances, the curvature of the surface 214(1) may include a radius between 18 millimeters and 24 millimeters (e.g., 21.22 millimeters), while the curvature of the surface 214(2) may include a radius between 8 millimeters and 14 millimeters (e.g., 11.38 millimeters). However, in other examples, the curvature of the surface 214(1) and/or the curvature of the surface 214(2) may include any other radius. Additionally, in other examples, the surface 214(1) may include an aspherical surface with a conic between −5 and 5.

The fourth lens element 204(4) may be designed to focus marginal rays to an image plane. The fourth lens element 204(4) may include a surface 216(1) located on the entrance side and a surface 216(2) located on the exit side of the fourth lens element 204(4). The fourth lens element 204(4) may include a biconvex lens, where the surface 216(1) includes a first convex surface and the surface 216(2) includes a second convex surface. In some instances, the curvature of the surface 216(1) may include a radius between 8 millimeters and 14 millimeters (e.g., 11.23 millimeters), while the curvature of the surface 216(2) may include a radius between 12 millimeters and 18 millimeters (e.g., 15.47 millimeters). However, in other examples, the curvature of the surface 216(1) and/or the curvature of the surface 216(2) may include any other radius. Additionally, in other examples, the surface 216(2) may include an aspherical surface with a conic between −5 and 5.

The fifth lens element 204(5) may be designed to direct the rays within the lens assembly 202 and/or reduce aberrations associated with the lens assembly 202 (e.g., reduce coma, field curvature, astigmatism, and/or other types of aberrations). The first lens 208(1) includes a surface 218(1) located on the entrance side and a surface 218(2) located on the exit side of the first lens 208(1). The first lens 208(1) may include a negative meniscus lens, where the surface 218(1) includes a first convex and the surface 218(2) includes a concave surface. In some instances, the curvature of the surface 218(1) may include a radius between 37 millimeters and 46 millimeters (e.g., 42.86 millimeters) while the curvature of the surface 218(2) may include a radius between 3 millimeters and 7 millimeters (e.g., 5.56 millimeters). However, in other examples, the curvature of the surface 218(1) and/or the curvature of the surface 218(2) may include any other radius.

The second lens 208(2) includes a surface 220(1) located on the entrance side and a surface 220(2) located on the exit side of the second lens 208(2). The surface 124(1) may include a biconvex lens, where the surface 220(1) includes first convex surface and the surface 220(2) includes a second convex surface. In some instances, the curvature of the surface 220(1) may include a radius between 3 millimeters and 7 millimeters (e.g., 5.56 millimeters) while the curvature of the surface 220(2) may include a radius between 830 millimeters and 880 millimeters (e.g., 858.26 millimeters). However, in other examples, the curvature of the surface 220(1) and/or the curvature of the surface 220(2) may include any other radius. In some examples, the first lens 208(1) includes the same material as the second lens 208(2). In other examples, the first lens 208(1) includes a different material than the second lens 208(2). For example, the first lens 208(1) may include crown glass while the second lens 208(2) includes flint glass.

The sixth lens element 204(6) may be designed to direct the rays within the lens assembly 202 and/or reduce aberrations associated with the lens assembly 202 (e.g., reduce coma, field curvature, astigmatism, and/or other types of aberrations). The sixth lens element 204(6) includes a surface 222(1) located on the entrance side and a surface 222(2) located on the exit side of the sixth lens element 204(6). The sixth lens element 204(6) may include a negative meniscus lens, where the surface 222(1) includes a convex surface and the surface 222(2) includes a concave surface. In some instances, the curvature of the surface 222(1) may include a radius between 5 millimeters and 10 millimeters (e.g., 7.92 millimeters) while the curvature of the surface 222(2) may include a radius between 3 millimeter and 7 millimeters (e.g., 5.14 millimeters). However, in other examples, the curvature of the surface 222(1) and/or the curvature of the surface 222(2) may include any other radius.

Finally, the seventh lens element 204(7) may be designed for field flattening, setting the chief ray angle, and reducing astigmatism. The seventh lens element 204(7) includes a surface 224(1) located on the entrance side and a surface 224(2) located on the exit side of the seventh lens element 204(7). The seventh lens element 204(7) may include a negative meniscus lens, where the surface 224(1) includes a convex surface and the surface 224(2) includes a concave, aspherical surface. In some instances, the curvature of the surface 222(1) may include a radius between 10 millimeters and 15 millimeters (e.g., 12.64 millimeters), while the curvature of the surface 222(2) may include a radius between 30 millimeter and 37 millimeters (e.g., 33.29 millimeters). However, in other examples, the curvature of the surface 222(1) and/or the curvature of the surface 222(2) may include any other radius. Additionally, in other examples, the surface 222(2) may include an aspherical surface with a conic between −5 and 5.

The imaging device 200 may also include a filter 226 located between the lens assembly 202 and a sensor 228, such as an image sensor. The filter 226 may allow certain frequencies of light to pass through to the sensor 228 while not allowing other frequencies of light to pass through to the sensor 228. For example, the filter 226 may allow frequencies of light included in the visible light spectrum to pass through to the sensor 228 while not letting frequencies of light that are included in the non-visible light spectrum to pass through to the senor 228. This way, only visible light may reach the sensor 228, thus reducing the amount of aberrations created by the lens assembly 202.

Although the example of FIG. 2A illustrates the filter 226 as being separate from the lens assembly 202, in other examples, the filter 226 may be included within the lens assembly 202. For example, the filter 226 may be located between two of the lens elements 204 within the lens assembly 202. Additionally, in some examples, the imaging device 200 may not include the filter 226.

Additionally, the imaging device 200 may include a cover 230 for the sensor 228. In some instances, the cover 230 may include a transparent material, such as glass or plastic, that allows the light rays to pass through to the sensor 228.

As further illustrated in the example of FIG. 2A, the lens assembly 202 may include an aperture stop 232 located between the fourth lens element 204(4) and the fifth lens element 204(5). In some instances, the diameter of the aperture stop 232 may be proximate to the diameter of one or more of the lens elements 204. This may maximize the amount of light that is able to pass through the lens assembly 202 to the sensor 228.

Figure 2B:
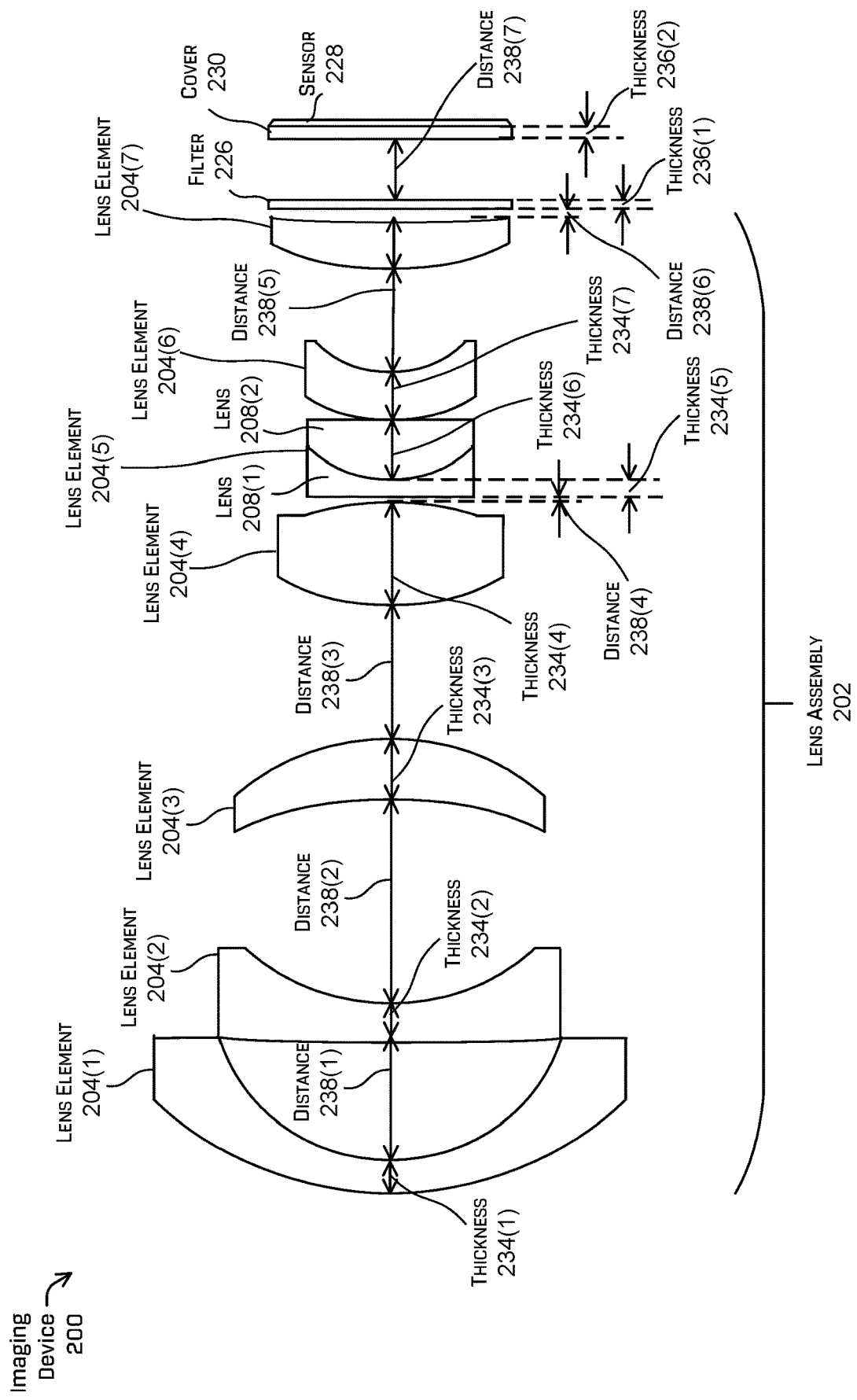
FIG. 2B is an example of thicknesses and spacing between optical elements along the optical axis of components of the imaging device from FIG. 2A, in accordance with embodiments of the disclosure.

FIG. 2B is an example of thicknesses along the axial axis 206 of components of the imaging device 200 from FIG. 2A, in accordance with embodiments of the disclosure. As shown, the first lens element 204(2) may include a thickness 234(1) between 1 millimeter and 2 millimeters (e.g., 1.58 millimeters), the second lens element 204(2) may include a thickness 234(2) between 1 millimeters and 2 millimeters (e.g., 1.47 millimeters), the third lens element 204(3) may include a thickness 234(3) between 2 millimeters and 4 millimeters (e.g., 2.8 millimeters), the fourth lens element 204(4) may include a thickness 234(4) between 3 millimeters and 6 millimeters (e.g., 4.78 millimeters), the first lens 208(1) of the fifth lens element 204(5) may include a thickness 234(5) between 0.5 millimeters and 1.5 millimeters (e.g., 1 millimeter), the second lens 208(2) of the fifth lens element 204(5) may include a thickness 234(6) between 2 millimeters and 4 millimeters (e.g., 2.8 millimeters), the sixth lens element 204(6) may include a thickness 234(7) between 1 millimeters and 3 millimeters (e.g., 2.2 millimeters, and the seventh lens element 204(7) may include a thickness 234(8) between 1 millimeters and 3 millimeters (e.g., 2.51 millimeters).

The example of FIG. 2B also illustrates the thicknesses of other components of the imaging device 200. For example, the filter 226 may include a thickness 236(1) between 0.1 millimeters and 0.7 millimeters (e.g., 0.4 millimeters) and the cover 230 may include a thickness 236(2) between 0.1 millimeters and 0.8 millimeters (e.g., 0.5 millimeters).

Furthermore, the example of FIG. 2B illustrates the distances between the components of the imaging device 200. For example, the distance 238(1) between the first lens element 204(1) and the second lens element 204(2) may be between 6 millimeters and 10 millimeters (e.g., 5.94 millimeters), the distance 238(2) between the second lens element 204(2) and the third lens element 204(3) may be between 7 millimeters and 12 millimeters (e.g., 9.62 millimeters), the distance 238(3) between the third lens element 204(3) and the fourth lens element 204(4) may be between 4 millimeters and 8 millimeters (e.g., 6.43 millimeters), the distance 238(4) between the fourth lens element 204(4) and the fifth lens element 204(5) may be between 0.05 millimeters and 0.2 millimeters (e.g., 0.15 millimeters), the distance between the fifth lens element 204(5) and the sixth lens element 204(6) (not illustrated for clarity reasons) may be between 0.1 millimeters and 0.3 millimeters (e.g., 0.2 millimeters), the distance 238(5) between the sixth lens element 204(6) and the seventh lens element 204(7) may be between 2 millimeters and 6 millimeters (e.g., 4.84 millimeters), the distance 238(6) between the seventh lens element 204(7) and the filter 226 may be between 0.5 millimeters and 1.5 millimeters (e.g., 0.9 millimeters), and the distance 238(7) between the filter 226 and the cover 230 may be between 0.2 millimeters and 0.6 millimeters (e.g., 0.4 millimeters).

As discussed above, in some examples, the lens assembly 202 may include an aperture spot 232 located between the fourth lens element 204(4) and the fifth lens element 204(5). In such examples, a distance between the fourth lens element 204(4) and the aperture stop 232 may be between 0.1 millimeters and 0.2 millimeters (e.g., millimeters). Additionally, in some examples, the imaging device 200 may not include the filter 226 and/or the cover 230. In such instances, the distance between the seventh lens element 204(7) and the sensor 228 may be between 1 millimeter and 4 millimeters (e.g., 2.61 millimeters).

Figure 2C:
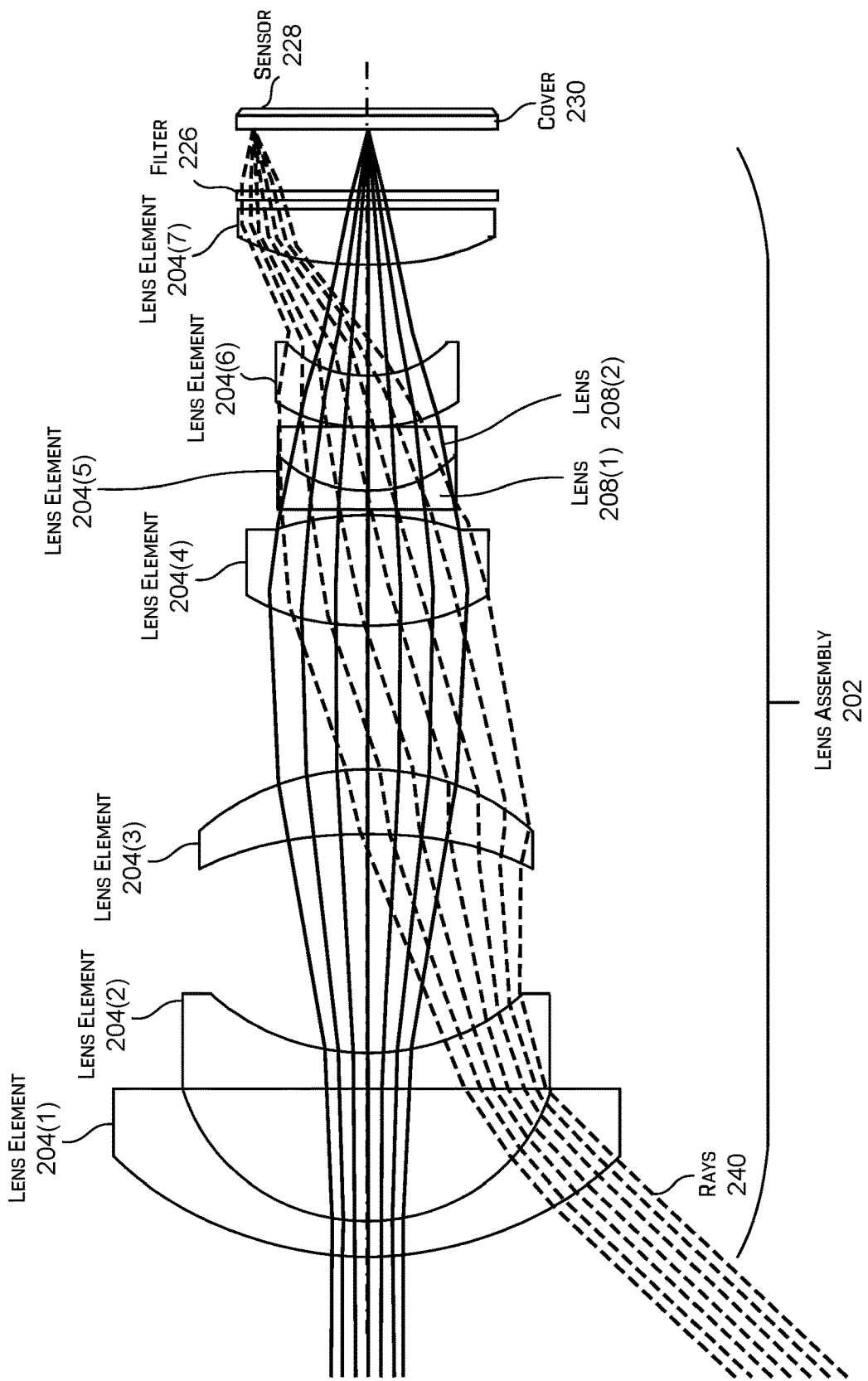
FIG. 2C is an example of light ray bundles passing through the lens assembly from FIG. 2A, in accordance with embodiments of the disclosure.

FIG. 2C is an example of light ray bundles passing through the lens assembly 202 from FIG. 2A, in accordance with embodiments of the disclosure. As shown, the first lens element 204(1), which includes negative optical power, is configured to reduce the large angles of the rays 240 entering the lens assembly 202. Also, since the first lens element 204(1) includes negative optical power, the first lens element 204(1) is configured to diverge the rays 240.

The second lens element 204(2), which includes negative optical power, is configured to reduce the chief ray angle. Also, since the second lens element 204(2) includes negative optical power, the second lens element 204(2) is configured to further diverge the rays 240.

The third lens element 204(3), which includes positive optical power, is configured to reduce the marginal ray angle, compensate for lateral color of previous lenses so that chromatic ray separation is minimal at a subsequent aperture stop, and balances spherical aberrations and coma. Also, since the third lens element 204(3) includes negative optical power, the third lens element 204(3) is configured to further diverge the rays 240.

The fourth lens element 204(4), which includes positive optical power, is configured to focus marginal rays 240 to the image plane. Also, since the fourth lens element 204(4) includes positive optical power, the fourth lens element 204(4) is configured to start converging the rays 240.

The fifth lens element 204(5), which includes the first lens 208(1) having negative optical power and the second lens 208(2) having positive optical power, is configured to direct the rays 240 within the lens assembly 202 and/or reduce aberrations associated with the lens assembly 202 (e.g., reduce coma, field curvature, astigmatism, and/or other types of aberrations). Also, since the fifth lens element 204(5) includes positive optical power, the fifth lens element 204(5) is configured to further converge the rays 240.

The sixth lens element 204(6), which includes negative optical power, is configured to direct the rays 240 within the lens assembly 202 and/or reduce aberrations associated with the lens assembly 202 (e.g., reduce coma, field curvature, astigmatism, and/or other types of aberrations). Also, since the sixth lens element 204(6) includes positive optical power, the sixth lens element 204(6) is configured to further converge the rays 240.

Finally, the seventh lens element 204(7), which includes positive optical power, is configured for field flattening, setting the chief ray angle, and reducing astigmatism. Also, since the seventh lens element 204(7) includes positive optical power, the seventh lens element 204(7) is configured to further converge the rays 240.

FIG. 3 is a table 302 that provides example design parameters for the lens assembly 102 from the example of FIG. 1A, in accordance with embodiments of the disclosure. While these are just an example of design parameters that may be used for the lens assembly 102, in other examples, one or more of the design parameters from the table 302 may be different. Additionally, in some examples, one or more of the design parameters may be equally scaled such that the lens assembly 102 can be included in a device that includes different dimensions that the devices described above. For example, each of the design parameters may be doubled such that the lens assembly 102 can be included in a device that is twice as big as the devices described herein.

FIG. 4 is a table 402 that provides example design parameters for the lens assembly 202 from the example of FIG. 2A, in accordance with embodiments of the disclosure. While these are just an example of design parameters that may be used for the lens assembly 202, in other examples, one or more of the design parameters from the table 402 may be different. Additionally, in some examples, one or more of the design parameters may be equally scaled such that the lens assembly 202 can be included in a device that includes different dimensions that the devices described above.

EXAMPLE CLAUSES

A: An apparatus comprising: a sensor; a lens assembly having first side distal from the sensor and a second side proximal to the sensor, the lens assembly comprising: a first lens element located at the first side of the lens assembly, the first lens element having negative optical power; a second lens element located at an second side of the lens assembly, the second lens element having positive optical power; a third lens element located between the first lens element and the second lens element, the third lens element including a first lens having negative optical power and a second lens having positive optical power; a fourth lens element located between the third lens element and the second lens element, the fourth lens element having positive optical power; and a fifth lens element located between the fourth lens element and the second lens element, the fifth lens element including a third lens having positive optical power and a fourth lens having negative optical power.

B: The apparatus as recited in paragraph A, wherein the lens assembly includes a horizontal field of view of at least 80 degrees and a total track length that is less than or equal to 50 millimeters.

C: The apparatus as recited in either paragraph A or paragraph B, wherein the lens assembly causes an angle associated with rays of light incident on the sensor and proximate to an edge of the sensor to be approximately 10 degrees.

D: The apparatus as recited in any of paragraphs A-C, wherein the first lens element includes: a convex surface located on a first side of the first lens element, the convex surface including a radius between 9 millimeters and 11 millimeters and a conic between −0.5 and −0.9; and a concave surface located on a second side of the first lens element, the concave surface including a radius between 1 millimeter and 7 millimeters and a conic between −1.5 and −2.

E: The apparatus as recited in any of paragraphs A-D, wherein: the first lens includes a first concave surface located on a first side of the first lens and a second concave surface located on a second side of the first lens; and the second lens includes a first convex surface located on a first side of the second lens and a second convex surface located on a second side of the second lens.

F: The apparatus as recited in any of paragraphs A-E, wherein the fourth lens element includes a convex surface located on a first side of the fourth lens element and a planar surface located at a second side of the fourth lens element, the convex surface including a radius between 10 millimeters and 16 millimeters.

G: The apparatus as recited in any of paragraphs A-F, wherein: the third lens includes a first convex surface located on a first side of the third lens and a second convex surface located on a second side of the third lens; and the fourth lens includes a first concave surface located on a first side of the fourth lens and a second concave surface located on a second side of the fourth lens.

H: The apparatus as recited in any of paragraphs A-G, wherein the second lens element includes: a first convex surface located on a first side of the fourth lens element, the first convex surface including a radius between 8 millimeters and 14 millimeters and a conic between 1.5 and 2; and a second convex surface located on a second side of the second lens element, the second convex surface including a radius between 45 millimeters and 55 millimeters.

I: A lens assembly comprising: a first lens element located at a first side of the lens assembly, the first lens element having negative optical power; a second lens element located adjacent to the first lens element, the second lens element including a first lens having negative optical power and a second lens having positive optical power; a third lens element located adjacent to the second lens element, the third lens element having positive optical power; a fourth lens element located adjacent to the third lens element, the fourth lens element including a third lens having positive optical power and a fourth lens having negative optical power; and a fifth lens element located at a second side of the lens assembly, the second lens element having positive optical power.

J: The lens assembly as recited in paragraph I, wherein the lens assembly includes a horizontal field of view of at least 80 degrees;

K: The lens assembly as recited in either paragraph I or paragraph J, wherein the lens assembly causes an angle associated with rays of light incident on a sensor and proximate to an edge of the sensor to be approximately 10 degrees.

L: The lens assembly as recited in any of paragraphs I-K, wherein the lens assembly includes a total track length that is less than or equal to 50 millimeters and a diameter that is less than or equal to 13 millimeters.

M: The lens assembly as recited in any of paragraphs I-L, further comprising an aperture stop located between the fourth lens element and the fifth lens element.

N: The lens assembly as recited in any of paragraphs I-M, wherein the first lens element includes: a convex surface located at a first side of the first lens element, the convex surface including a radius between 9 millimeters and 11 millimeters and a conic between −0.5 and −0.9; and a concave surface located on a second side of the first lens element, the concave surface including a radius between 1 millimeter and 7 millimeters and a conic between −1.5 and −2.

O: The lens assembly as recited in any of paragraphs I-N, wherein: the first lens includes a first concave surface located on a first side of the first lens and a second concave surface located on a second side of the first lens; and the second lens includes a first convex surface located on a first side of the second lens and a second convex surface located on a second side of the second lens.

P: The less assembly as recited in any of paragraphs I-O, wherein the third lens element includes a convex surface located on a first side of the third lens element and a planar surface located at a second side of the third lens element, the convex surface including a radius between 9 millimeters and 16 millimeters.

Q: The lens assembly as recited in any of paragraphs I-P, wherein: the third lens includes a first convex surface located on a first side of the third lens and a second convex surface located on a second side of the third lens; and the fourth lens includes a first concave surface located on a first side of the fourth lens and a second concave surface located on a second side of the fourth lens.

R: The lens assembly as recited in any of paragraphs I-Q, wherein the fifth lens element includes: a first convex surface located on a first side of the fifth lens element, the first convex surface including a between radius 8 millimeters and 14 millimeters and a conic between 1.5 and 2; and a second convex surface located on a second side of the fifth lens element, the second convex surface including a radius between 45 millimeters and 55 millimeters.

S: A lens assembly comprising: at least five lens elements arranged in sequence along an optical axis of the lens assembly, one or more first lens elements from the at least five lens elements having positive optical power and one or more second lens elements from the at least five lens elements having negative optical power, wherein the lens assembly is configured to reduce field curvature with including a horizontal field of view of at least 80 degrees, a total track length that is less than or equal to 50 millimeters, and a diameter that is less than or equal to 13 millimeters.

T: The lens assembly as recited in paragraph S, wherein the lens assembly causes an angle associated with rays of light incident on a sensor and proximate to an edge of the sensor to be approximately 10 degrees.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An apparatus comprising: a sensor; a lens assembly having first side distal from the sensor and a second side proximal to the sensor, the lens assembly comprising: a first lens element located at the first side of the lens assembly, the first lens element having negative optical power; wherein the first lens element includes a negative meniscus lens, wherein: an aspherical convex surface is located on a first side of the first lens element, the aspherical convex surface including a radius between 9 millimeters and 11 millimeters and a conic constant between −0.5 and −0.9: and a concave surface is located on a second side of the first lens element, the concave surface including a radius between 1 millimeter and 7 millimeters and a conic constant between −1.5 and −2; a second lens element located at the second side of the lens assembly and proximal to the sensor, the second lens element comprising a biconvex lens that includes a first convex, aspherical surface and a second convex surface facing the sensor, wherein the second lens element has positive optical power; a third lens element located between the first lens element and the second lens element, the third lens element including a first lens having negative optical power and a second lens having positive optical power; a fourth lens element located between the third lens element and the second lens element, the fourth lens element having positive optical power; and a fifth lens element located between the fourth lens element and the second lens element, the fifth lens element including a third lens having positive optical power and a fourth lens having negative optical power.

2. The apparatus as recited in claim 1, wherein the lens assembly includes a horizontal field of view of at least 80 degrees and a total track length that is less than or equal to 50 millimeters.

3. The apparatus as recited in claim 2, wherein the lens assembly causes an angle associated with rays of light incident on the sensor and proximate to an edge of the sensor to be approximately 10 degrees.

4. The apparatus as recited in claim 1, wherein:
the first lens of the third lens element includes a first concave surface located on a first side of the first lens and a second concave surface located on a second side of the first lens;
the second lens of the third lens element includes a first convex surface located on a first side of the second lens and a second convex surface located on a second side of the second lens; and
the second concave surface located on the second side of the first lens is contiguous with the first convex surface located on the first side of the second lens.

5. The apparatus as recited in claim 1, wherein the fourth lens element includes a convex surface located on a first side of the fourth lens element and a planar surface located at a second side of the fourth lens element, the convex surface including a radius between 10 millimeters and 16 millimeters.

6. The apparatus as recited in claim 1, wherein:
the third lens of the fifth lens element includes a first convex surface located on a first side of the third lens and a second convex surface located on a second side of the third lens; and
the fourth lens of the fifth lens element includes a first concave surface located on a first side of the fourth lens and a second concave surface located on a second side of the fourth lens; and
the second convex surface located on the second side of the third lens is contiguous with the first concave surface located on the first side of the fourth lens.

7. The apparatus as recited in claim 1, wherein: the first convex, aspherical surface of the second lens element comprises a radius between 8 millimeters and 14 millimeters and a conic constant between 1.5 and 2; and the second convex surface of the second lens element comprises a radius between 45 millimeters and 55 millimeters.

8. A lens assembly comprising: a first lens element located at a first side of the lens assembly, the first lens element having negative optical power; wherein the first lens element includes a negative meniscus lens, wherein: an aspherical convex surface is located at a first side of the first lens element, the aspherical convex surface including a radius between 9 millimeters and 11 millimeters and a conic constant between −0.5 and −0.9: and a concave surface is located on a second side of the first lens element, the concave surface including a radius between 1 millimeter and 7 millimeters and a conic constant between −1.5 and −2; a second lens element located adjacent to the first lens element, the second lens element including a first lens having negative optical power and a second lens having positive optical power; a third lens element located adjacent to the second lens element, the third lens element having positive optical power; a fourth lens element located adjacent to the third lens element, the fourth lens element including a third lens having positive optical power and a fourth lens having negative optical power; and a fifth lens element located at a second side of the lens assembly in order to be proximal to a sensor, the fifth lens element comprising a biconvex lens that includes a first convex, aspherical surface and a second convex surface facing the sensor, wherein the fifth lens element has positive optical power.

9. The lens assembly as recited in claim 8, wherein the lens assembly includes a horizontal field of view of at least 80 degrees.

10. The lens assembly as recited in claim 8, wherein the lens assembly causes an angle associated with rays of light incident on the sensor and proximate to an edge of the sensor to be approximately 10 degrees.

11. The lens assembly as recited in claim 8, wherein the lens assembly includes a total track length that is less than or equal to 50 millimeters and a diameter that is less than or equal to 13 millimeters.

12. The lens assembly as recited in claim 8, further comprising an aperture stop located between the third lens element and the fourth lens element.

13. The lens assembly as recited in claim 8, wherein:
the first lens of the second lens element includes a first concave surface located on a first side of the first lens and a second concave surface located on a second side of the first lens; and
the second lens of the second lens element includes a first convex surface located on a first side of the second lens and a second convex surface located on a second side of the second lens.

14. The lens assembly as recited in claim 8, wherein the third lens element includes a convex surface located on a first side of the third lens element and a planar surface located at a second side of the third lens element, the convex surface including a radius between 9 millimeters and 16 millimeters.

15. The lens assembly as recited in claim 8, wherein:
the third lens of the fourth lens element includes a first convex surface located on a first side of the third lens and a second convex surface located on a second side of the third lens; and
the fourth lens of the fourth lens element includes a first concave surface located on a first side of the fourth lens and a second concave surface located on a second side of the fourth lens.

16. The lens assembly as recited in claim 8, wherein: the first convex, aspherical surface of the fifth lens element comprises a radius between 8 millimeters and 14 millimeters and a conic constant between 1.5 and 2; and the second convex surface of the fifth lens element comprises a radius between 45 millimeters and 55 millimeters.

17. A lens assembly comprising:
a first lens element located at a first side of the lens assembly, the first lens element having negative optical power;
a second lens element located adjacent to the first lens element, the second lens element including a first lens having negative optical power and a second lens having positive optical power;
wherein the first lens of the second lens element includes a first concave surface located on a first side of the first lens and a second concave surface located on a second side of the first lens; and
wherein the second lens of the second lens element includes a first convex surface located on a first side of the second lens and a second convex surface located on a second side of the second lens;
a third lens element located adjacent to the second lens element, the third lens element having positive optical power;
a fourth lens element located adjacent to the third lens element, the fourth lens element including a third lens having positive optical power and a fourth lens having negative optical power; and
a fifth lens element located at a second side of the lens assembly in order to be proximal to a sensor, the fifth lens element comprising a biconvex lens that includes a first convex, aspherical surface and a second convex surface facing the sensor, wherein the fifth lens element has positive optical power.

18. A lens assembly comprising:
a first lens element located at a first side of the lens assembly, the first lens element having negative optical power;
a second lens element located adjacent to the first lens element, the second lens element including a first lens having negative optical power and a second lens having positive optical power;
a third lens element located adjacent to the second lens element, the third lens element having positive optical power;
wherein the third lens element includes a convex surface located on a first side of the third lens element and a planar surface located at a second side of the third lens element, the convex surface including a radius between 9 millimeters and 16 millimeters;
a fourth lens element located adjacent to the third lens element, the fourth lens element including a third lens having positive optical power and a fourth lens having negative optical power; and
a fifth lens element located at a second side of the lens assembly in order to be proximal to a sensor, the fifth lens element comprising a biconvex lens that includes a first convex, aspherical surface and a second convex surface facing the sensor, wherein the fifth lens element has positive optical power.

19. A lens assembly comprising:
a first lens element located at a first side of the lens assembly, the first lens element having negative optical power;
a second lens element located adjacent to the first lens element, the second lens element including a first lens having negative optical power and a second lens having positive optical power;
a third lens element located adjacent to the second lens element, the third lens element having positive optical power;
a fourth lens element located adjacent to the third lens element, the fourth lens element including a third lens having positive optical power and a fourth lens having negative optical power; and a fifth lens element located at a second side of the lens assembly in order to be proximal to a sensor, the fifth lens element comprising a biconvex lens that includes a first convex, aspherical surface and a second convex surface facing the sensor, wherein the fifth lens element has positive optical power, wherein:

the first convex, aspherical surface of the fifth lens element comprises a radius between 8 millimeters and 14 millimeters and a conic between 1.5 and 2; and the second convex surface of the fifth lens element comprises a radius between 45 millimeters and 55 millimeters.

\* \* \* \* \*